UNITED STATES PATENT OFFICE.

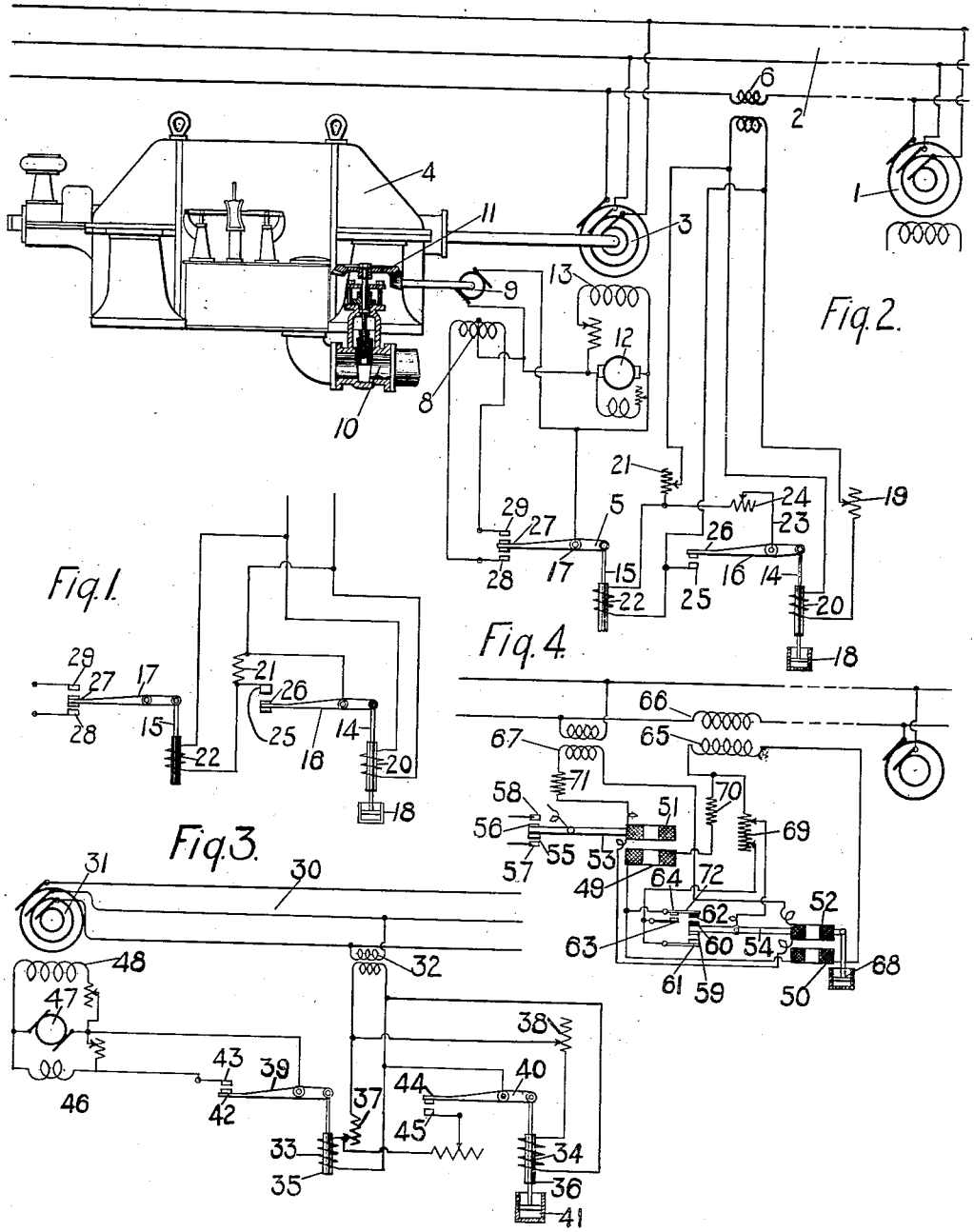

HAROLD W. BROWN, OF ITHACA, NEW YORK, ASSIGNOR TO WESTINGHOUSE ELECTRIC AND MANUFACTURING COMPANY, A CORPORATION OF PENNSYLVANIA.

ELECTRICAL REGULATOR.

1,234,865.  Specification of Letters Patent.  Patented July 31, 1917.

Application filed January 7, 1914. Serial No. 810,797.

*To all whom it may concern:*

Be it known that I, HAROLD W. BROWN, a citizen of the United States, and a resident of Ithaca, in the county of Tompkins and State of New York, have invented a new and useful Improvement in Electrical Regulators, of which the following is a specification.

My invention relates to electrical regulators, and it has for its object to provide a device for regulating the voltage of a circuit or for regulating the flow of steam in a prime mover in proportion to the current, voltage or power of said circuit.

The present invention is based upon the principle that there must necessarily be a time lag after the regulator acts before the machine or circuit is regulated. It anticipates the condition of operation that the machine or circuit will have after a certain predetermined time has elapsed and assumes that the rate of change in this condition is constant.

An understanding of the operation of my invention may be had by referring to the accompanying drawings, of which Figure 1 is a diagrammatic view of a regulating system embodying my invention, Fig. 2 is a diagrammatic view, partially in elevation and partially in section, of a regulator embodying my invention as applied to a prime mover, Fig. 3 is a diagrammatic view of a modified form of regulator controlling the voltage of a system, and Fig. 4 is a diagrammatic view of a modified form of regulator for regulating the steam flow of a prime mover or the voltage of a system in proportion to the power.

Referring to Fig. 2 of the drawings, a generator 1 supplies a circuit 2 with current, and, at a considerable distance therefrom there is a generator 3 driven by a turbine 4 to supply the excess current needed over a definite normal amount. In order to regulate the supply of excess current, I provide a regulator 5 which receives current from a current transformer 6 that is proportional to the current in the circuit 2. The regulator 5 controls a field winding 8 of a motor 9 which operates a valve 10 through bevel gearing 11 and is itself supplied with current from an auxiliary generator 12 which also supplies a field winding 13 of the generator 3 with current. The regulator 5 comprises two electromagnets 14 and 15 that respectively operate pivoted lever arms 16 and 17. The electromagnet 14 is provided with a dash-pot 18 to retard the motion of its armature. A resistor 19 and the winding 20 of the magnet 14 are connected in circuit with the secondary winding of the transformer 6. In parallel with the above mentioned circuit, is a second circuit comprising a resistor 21 and the winding 22 of the electromagnet 15. A short circuit 23 around the winding 22 of the electromagnet 15 includes a resistor 24 and is opened and closed by the lever arm 16 establishing a short circuit, and the contact members 25 and 26 the former of which is mounted on the lever. The lever 17 is connected to one terminal of the generator 12, the other terminal of which is connected to the central point of the field winding 8. The lever 17 has a double contact member 27 which makes contact with the one or the other of two stationary contact pieces 28 and 29. The contact pieces 28 and 29 are connected to the respective ends of the field winding 8.

The operation of my invention is as follows: If the current in the circuit 2 increases to such an extent that generator 3 must operate to help the generator 1 to supply the load, the magnet windings 20 and 22 become energized and the armature of electromagnet 15 effects engagement between the contact members 27 and 28, thereby causing the motor 9 to operate the valve 10 and admit steam to the turbine 4. The electromagnet 14, which has been retarded by the dash pot 18, now operates, to effect engagement between contact members 25 and 26, thereby diverting part of the current from the winding 22 of the electromagnet 15. As part of the current has been diverted from the coil 22, its armature may drop sufficiently to effect engagement between contact members 27 and 29. If contact is effected, the current in the field winding 8 of the motor 9 is reversed, causing less steam to be admitted to the turbine. As the current increases on the side of generator 3 away from the generator 1, the current falls on the generator 1 side of generator 3, whereby less current is supplied to the winding 20 of the electromagnet 14. The armature of magnet 14 consequently descends and effects separation of the contact members 25 and 26. This cycle of operations may continue indefinitely, being dependent upon the relative rates of change in the circuit and serving to maintain the load carried by generator 1 substantially uniform, enough steam being admitted to the turbine to enable the generator 3 to supply the excess over a predetermined amount of load upon the system.

The modification shown in Fig. 1 comprises essentially the same members as the modification shown in Fig. 2, except that the lever 16, instead of short circuiting the magnet winding 22, removes a short circuit from around the resistor 21, thereby allowing less current to flow through the winding 22. The operation is practically the same as the operation hereinbefore described in that the magnetization of the magnet winding 22 is changed a relatively short time after its initial operation.

For use in regulating the voltage of a circuit 30 which receives power from a generator 31, I provide, as shown in Fig. 3, a potential transformer 32 which supplies windings 33 and 34 of electromagnets 35 and 36 with current at a voltage that is proportional to the line viltage. The current in the winding 33 is controlled by a resistor 37, and the current in the winding 34 is controlled by a resistor 38. The electromagnet 35 operates a lever 39 and the electromagnet 36 operates a lever 40. A dash-pot 41 retards the movement of the armature of the electromagnet 36. On the lever 39 is a contact member 42 which makes contact with a stationary contact member 43, while the lever 40 has a contact member 44 which makes contact with a stationary contact member 45. The contact members 42 and 43 complete a circuit in shunt to a rheostat that is in series with a field winding 46 of an exciter 47 which supplies current to a field winding 48 of the generator 31. The contact members 44 and 45 complete a short circuit around the coil 33, thereby shunting some of the current therefrom.

The operation of my invention for use as a voltage regulator is as follows: A decrease of voltage on the lines of the circuit 30 reduces the excitation of electromagnets 35 and 36 sufficiently to permit their armatures to effect engagement between the contact members 42 and 43 and, a little later, to effect disengagement of contact members 44 and 45. The voltage of the exciter 47 is thereby increased, followed by a corresponding increase in the field excitation and voltage of the generator 31. As the voltage increases, the electromagnets 35 and 36 become more strongly energized and draw their armatures up to effect disengagement of the contact members 42 and 43 and thereby open the circuit of field winding 46 and cause the voltage to decrease on the lines of circuit 30. After the contact members 42 and 43 have become disengaged, the electromagnet 36 operates to effect engagement between the contact members 44 and 45 and thereby decrease the strength of the electromagnet 35 and cause the contact members 42 and 43 to be again moved into engagement. This operation is continuous as long as the voltage tends to fluctuate and thereby maintains a practically constant voltage on the generator.

In order to adapt my invention to regulate the steam flow in a prime mover in proportion to the power consumed, my invention comprises, as shown in Fig. 4, series connected current coils 49 and 50 and series connected voltage coils 51 and 52, coils 51 and 52 being respectively supported by levers 53 and 54. The lever 53 is provided with contact members 55 and 56 which respectively make contact with stationary contact members 57 and 58. The lower side of the lever 54 is provided with a contact member 59 and its upper side is provided with an insulator 60. Contact member 59 engages stationary contact member 61 and insulator 60 engages a second insulator 62 having a resilient base 72 to effect separation of contact members 63 and 64. The coils 49 and 50 receive their current from a series transformer 65 while the coils 51 and 52 receive current at a voltage that is proportional to the voltage of the circuit 66 from a transformer 67.

If the energy traversing the circuit 66 increases to such an extent that the generator 3 must assist the generator 1, the windings or coils 51 and 52 tend to move away from the stationary windings 49 and 50, respectively, thereby effecting engagement between the contact members 55 and 57 to cause the motor 9, as shown in Fig. 2, to operate the valve 10 for the purpose of admitting steam to the turbine 4. The winding 52, that has been retarded by the dash pot 68, now operates to first effect engagement between the contact members 63 and 64, thereby diverting part of the current from the winding 49, and then to effect engagement between the contact members 59 and 61, thereby diverting a substantially larger part of the current from the winding 49. As part of the current has been diverted from the winding 49, the repulsion between the windings 49 and 51 is decreased, and the winding 51 may move downwardly sufficiently to effect engagement between the contact members 56 and 58. If contact is effected, the current traversing the field winding 8 of the motor 9 is reversed, causing less steam to be admitted to the turbine. As the energy increases on the side of the generator 3 away from the generator 1, the energy decreases on the generator 1 side of the generator 3, whereby less energy is supplied to the winding 50, thus causing the winding 52 to move downwardly to effect disengagement of the contact members 59 and 61 and 63 and 64 successively. This cycle of operations may continue indefinitely, being dependent upon the relative rates of change in the circuit, substantially as hereinbefore set forth in connection with Fig. 2.

I do not limit my invention to any particular form or arrangement except as set forth in the appended claims.

I claim as my invention:

1. An electrical regulator comprising two sets of relatively movable contact members, means for retarding the relative movements of one set of said members, continuously energized actuating windings respectively for one member of each of said sets, the retarded contact member controlling the degree of energization of the winding that actuates the other set of contact members.

2. An electrical regulator comprising two sets of relatively movable contact members, means for retarding the relative movements of one set of said members, and actuating windings respectively for one member of each of said sets, the winding for actuating the retarded contact member being continuously energized, and the retarded contact member controlling the degree of energization of the winding that actuates the other of said contact members.

3. The combination with an electrical circuit, of a regulator responsive to variations in the amount of power traversing the circuit comprising two sets of relatively movable contact members, means for retarding the relative movements of one set of said members, and current and voltage coils receiving current from the said circuit for actuating one member of each of said sets, the retarded contact member controlling the degree of energization of one of the coils that actuate the other set of contact members.

4. The combination with an electrical circuit, of a regulator responsive to variations in the amount of energy traversing the circuit comprising two sets of relatively movable contact members, means for retarding the relative movements of one set of said members, and current and voltage windings receiving current from the said circuit for actuating each of said sets, the retarded contact members being adapted to control the degree of energization of one of the windings that actuates the other set of contact members.

5. The combination with an electrical circuit, of a regulator responsive to variations in the amount of energy traversing the circuit comprising two sets of relatively movable contact members, means for retarding the relative movements of one set of said members, current and voltage windings receiving current from the said circuit for actuating each of said sets, and a variable resistor, the retarded contact members being adapted to successively insert various portions of the resistor in shunt relation to one of the windings that actuates the other set of contact members.

In testimony whereof, I have hereunto subscribed my name this 17th day of December 1913.

HAROLD W. BROWN.

Witnesses:
B. T. Cook,
James L. Baker.